July 21, 1964

G. M. J. SAROFEEN 3,141,273

POLISHING SYNTHETIC RESIN LENSES

Filed Dec. 7, 1962

INVENTOR
GEORGE M. J. SAROFEEN
BY Cushman, Darby & Cushman
ATTORNEYS

United States Patent Office 3,141,273
Patented July 21, 1964

3,141,273
POLISHING SYNTHETIC RESIN LENSES
George M. J. Sarofeen, Colonial Heights, Va., assignor to Titmus Optical Company, Inc., Petersburg, Va., a corporation of Virginia
Filed Dec. 7, 1962, Ser. No. 243,009
15 Claims. (Cl. 51—284)

The present invention relates to the polishing of lenses. More particularly, this invention relates to the polishing of synthetic resin lenses.

This application is a continuation-in-part of my copending application Serial No. 37,277, filed June 20, 1960 for Polishing Synthetic Resin Lenses and now United States Patent No. 3,077,707.

The phenomena resulting in the polishing of glass and particularly in the polishing of glass lenses, have long been the subject of empirical probing by lens makers. The process itself, the act of polishing through removal or smoothing has not, until recently, begun to be understood even in a limited degree. Theoretical foundations have been laid in the hypothesis that polishing of glass involves thermodynamic and chemical as well as abrasive actions. There has been accumulated a sufficient mass of data to support the theory and it is now concluded that polishing of glass involves both chemical and physical phenomena. Glass is a relatively inert material and consequently can be acted upon chemically within narrow limits only.

It has been reported that the glass polishing process involves the hydration of glass surfaces. Experiments with pitch and felt as polishing mediums have resulted in pronounced smoothing of the glass and reduction in weight where only water was used as the polishing liquid. Chemical differences in a glass surface after polishing comprise depletion of sodium and increased acid solubility. These indicate changes which take place at the glass-water interface. There is a function attributed to the presence of oxides in the water used for the preparation of polishing slurries. This has been considered to accelerate the basic polishing process of hydration and removal of glass.

In recent times there have been attempts made to polish certain organic dioptric materials such as synthetic resins for the purpose of creating lenses having increased shatter resistance and lightness of weight. These attempts have been frustrating in that the surfaces obtained on such organic lenses by glass polishing methods have been unsatisfactory for many reasons. The same techniques which are eminently successful for polishing glass lenses result in complete failure when applied to organic lenses. For many years there have been intensive efforts to adapt a glass lens polishing process to the polishing of organic lenses, but these efforts have resulted in unworkable techniques.

This failure, it has been found, is due to a basic difference which stems from the fact that glass is an inorganic material and the synthetic resin lenses are organic. Consequently, the hydration which is considered to form the basis of the glass polishing process will not necessarily operate in connection with organic lens materials. This is apt to be particularly so in the case of lenses fabricated from allylic organics, which family of materials are found to be exceptionally suitable for use in making ophthalmic lenses. This family of materials when properly prepared result in very inert substances and consequently are even less subject to ease of polishing through chemical means such as hydration, than glass is likely to be.

Another factor which contributes to the lack of susceptibility to polishing organic lenses by glass methods is the far greater plasticity and mobility of organic lens surfaces. Thermoplastic deformation of a glass surface under the pressure of a sharp, hard object has been clearly demonstrated by electron microscope photographs but only on a scale far larger than the molecular dimensions in which polishing occurs. In the same fashion allylic lenses, for example, evidence a far greater degree of deformation than glass when acted upon by a sharp, hard pointed object.

In general, the process of polishing lies within the field of adhesion of solids. If solid surfaces are placed together, the regions of intimate contact are subject to very strong adhesions; in fact, the junctions so formed have strength of the same order of magnitude as the solids themselves. These junctions are responsible for the resistance to sliding, the frictional force being the force required to shear them. Although these junction forces are very strong, they exist for the most part only while the joining load is being applied. This is due mainly to the effect of released elastic stresses or other types of stress concentration which rupture the junctions as the joining load is removed. For this reason, frictional phenomena under joining load relates to the effectiveness of polishing action which is found to be greater proportionally to increased degrees of joining pressure up to an extent. There is an extent beyond which increased joining pressure seems to have little if any effect upon the increase in polishing effectiveness. This can be assumed to be due to near complete contact between the surfaces involved and near complete effectiveness of juncture at or above a given pressure of joining.

Also a factor in making junctures of varying effectiveness is the presence of film forming substances whose film strength may be such as to lie within the interface contact area. The film or films exercise profound effects upon the efficacy of the polishing action. A film of one type composed of a thin layer of polyhydric alcohol will nearly decimate the ability of a known combination of water and certain oxides for polishing glass whereas, as taught in my above-mentioned copending application, the same polyhydric alcohol when added to a slurry for polishing non-glass bearing material will greatly enhance the polishing capability of such a mixture. Many instances of such a nature may be cited. These tend to point up very dramatically that many factors operate to create desirable polishing conditions. In the past, the art has revolved about assumptions which essentially were based upon water and metallic oxide slurries as such, as alone controlling the efficiency of polishing action. It has now been found that this is only partially true and in many instances is the least important, although vital, element involved in making efficient polishing mixtures of the type to which this invention applies, especially when applied to the polishing of non-glass and particularly organic lenses.

It has been known since the time of Newton that "putty powder" or, as it is now called, tin oxide was best suited to the polishing of soft dioptric materials such as calcium fluoride, calcium carbonate and potassium chloride, which materials were occasionally used for making prisms and lenses for special applications. It was, therefore, most logical when glass lens makers were first faced with the necessity for polishing organic lens materials that they should choose tin oxide as a principal oxide for preparing their polishing slurries. For approximately twenty years prior to this invention and that of my copending application, it was not possible to make this tin oxide behave properly to produce organic lenses of acceptable optical surface quality. Some of the objectionable side effects encountered were the creation of rips, tears and scratches in the surfaces of the lens. Also there was invariably a stippled pattern on those lens surfaces normally called "orange peel" by lens makers. It has been found that the creation of these surface defects is due to (a) the creation of excessive strength junctures between the polishing pad and the lens surface, (b) the creation of excessive interface temperatures, (c) excessive plastic deformation of the surface of the lens and (d) an abnormal expansion of the surface of the lens with relation to the immediate under layer.

The influence of adsorbed gas films is also profound. The effect of oxygen or oxides of a trace quantity within the polishing slurry operate to affect polishing efficiency. It has been found that contaminant films of a few angstroms depth can have varying influences on polishing speeds. These films can enter into the mechanics of the polishing process, or they can interlie the polishing pad and glass to completely nullify the desired effects.

These conditions stem from the peculiar behavior of tin oxide when it is put into a water slurry. Such a slurry when run for a short period of time in a polishing apparatus becomes loaded with agglomerates of tin oxide. These agglomerates form rapidly and are broken up only with great difficulty and cause the damage resulting in the aforementioned organic lens defects. Furthermore, it has been found that once the tin oxide is put into water first, such agglomerates are difficult to eliminate by later additions of chemicals. However, if the tin oxide is first mixed thoroughly with polyhydric alcohol, as set forth in my copending application, or other suitable chemicals, the later addition of water does not seem to promote the formation of these harmful agglomerates.

It is an object of the present invention to develop an improved procedure for polishing synthetic resin lenses.

Another object is to develop an improved composition suitable for polishing synthetic resin lenses.

A further object is to eliminate the problem of the hydration of stannic oxide when it is employed to polish lenses.

Yet another object is to eliminate the scratching and other undersirable side effects which occur when tin oxide or other suitable oxides are employed to aid in the polishing of synthetic resin lenses.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects may be achieved by introducing film formers to cause the creation of an interlayer of viscous liquid between the polishing pad and the lens surface to be polished. This film operates to ameliorate the harsh pulling effects of the polishing oxide. This is accomplished through a combination of surface tension and viscous forces. By controlling the solid-solid interaction in this way, it is possible to limit the adhesion of pad to the organic lens or adhesion of the polishing oxide to the lens in such a way as to create a desired degree of polishing action without allowing a build-up of adhesion.

For the purposes of describing this invention, it should be understood that the term "viscous liquid" denotes a liquid having a viscosity greater than that of water, or of mixtures of such materials including water which result in liquid vehicles having a viscosity greater than that of water alone. The "viscous liquid" refers only to the liquid vehicle into which suitable polishing solids may be introduced such as "tin oxide" or other suitable polishing oxides. There is no intention to include in the term "viscous liquid" any viscosity change due to the addition of polishing oxides. This is an important differentiation, for the present invention deals with phenomena operating within the sphere of influence of the liquid carrier vehicle for the purpose of controlling the action of the polishing oxides which are carried to the work by means of that liquid vehicle.

It is noteworthy to point out that certain conditions which deter glass polishing action will enhance organic lens polishing action. Specifically, the addition of a small amount of polyhydric alcohol to a glass polishing slurry will very substantially slow down its polishing speed and produce poor surfaces; whereas, as seen in my copending application, the addition of polyhydric alcohol to organic lens polishing slurries will enhance the polishing speed and produce surfaces of higher quality.

Figure 1:
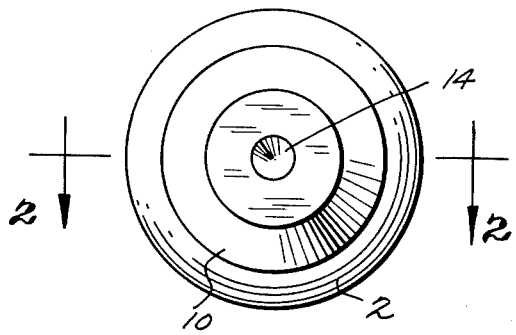
FIGURE 1 is a front elevation of the finishing or grinding machine.
Figure 2:
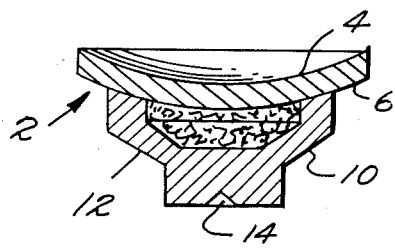
FIGURE 2 is a section taken along the line 2—2 in FIGURE 1.
Figure 3:
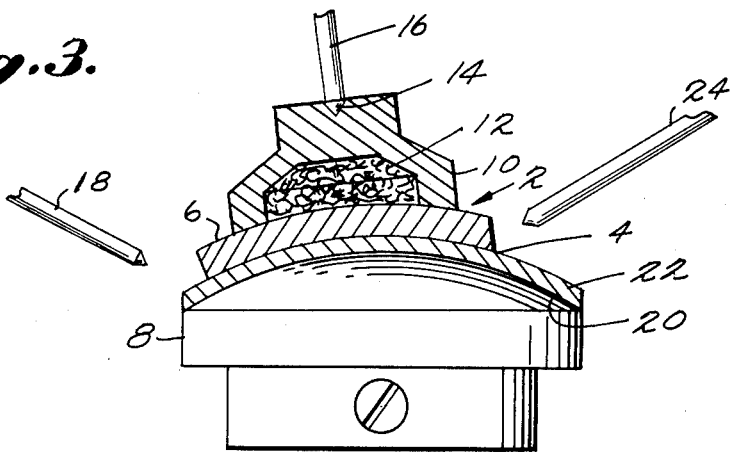
FIGURE 3 is a cross sectional view of the grinding machine modified for the polishing operation.

Referring more specifically to the drawings, there is provided a plastic lens blank 2 of generally spherical curvature. The front, inner face has a concave surface 4 and the rear, outer face a convex surface 6. The lens blank 2 is positioned upon cast iron grinding block 8 which has the mating configuration for that desired for the concave surface 4.

The lens blank 2 is prepared for grinding by cementing to the rear face 4 a block 10 by means of pitch or other adhesive 12. Block 10 has a conical center socket 14 aligned with the axis of the lens blank. There is also provided a centering spindle 16 having a pointed tip adapted to fit in socket 14. To grind the face of blank 2, the grinding block 8 is rotated about its own operating axis with blank 2 held against the upper surface of the block 8. Grinding compound such as emery, garnet or stannic oxide is supplied through tube 18.

The apparatus just described is that conventionally employed in the finishing operation. In order to perform the polishing operation, the same type of apparatus is employed with the following modification. To the top surface 20 of the grinding block 8 there is adhered a polishing pad 22, e.g., of felt or preferably of cotton velveteen. This pad must not be too soft or too hard. It should also have a proper backing so that it won't stretch or wrinkle. The backing portion of the pad can be of Saran, cellulose ester or other plastic and is united to the block 8 by any appropriate adhesive.

In the polishing operation the abrasive employed is preferably powdered stannic oxide with or without an ameliorating material such as powdered titanium dioxide, zirconia, chromic oxide, ferric oxide or magnesia. The ameliorating material prevents the stannic oxide from scratching while the stannic oxide in turn performs the cutting operation. In a preferred operation, a mixture of equal parts of stannic oxide and titanium dioxide having a particle size of under 44 microns is used. The amount of ameliorating material can be from 0 to 70% of the total of stannic oxide and ameliorating material.

It is critical in polishing plastic lenses that the cutting be done while the cutting materials are supported yieldingly. It has also been found critical according to the invention that there be supplied a viscous material to hold the abrasive in contact with the lens surface while at the same time not making it immovable. Accordingly, a mixture of abrasive and viscous material is supplied to the velveteen pad 22 through tube 18. While the abrasive and viscous material are preferably added through a single tube, separate supply tubes may be employed. The abrasive is then supplied through tube 18 and the viscous material through tube 24.

It has been found that certain wax emulsions will enhance the polishing capacity of a polishing slurry for organic lenses. In the above operation, the emulsion functions as a viscous material but not as a complete lubricant since it permits some frictional action. The emulsion is employed in amount to form the powders (stannic oxide with or without ameliorating material) into a viscous mixture.

The pile in the velveteen supports a homogeneous mass of polishing material which in the aggregate comprises a yieldable surfacing medium. The pile is in constant motion throughout the polishing operation.

The polishing material of this invention is prepared as follows. First, there is prepared a basic wax emulsion. This may be done by heating from about 10–30 parts wax with from about 3–10 parts by weight of an emulsifier until thorough mixing occurs at about 220° F. Then there is added to the mixture about 80–160 parts water heated to 200° F. in very small increments until thinning occurs. Too rapid an addition of water may promote a dangerous foaming reaction. To this emulsion there is added with stirring approximately an equal amount by weight of tin oxide or other suitable oxide to form a paste. Then is added, also with stirring, one part by weight of a cationic agent to increase viscosity of the final emulsion. A suitable agent is "Aerosol C–61" available from the American Cyanamid Company. To this resultant emulsion may now be added water or preferably odorless mineral spirits in small increments with agitation until a desired viscosity is attained, such as from 10 to 1500 centipoises and preferably from 1000 to 1200 centipoises. It is to be borne in mind that one manner of discerning the suitability of such a mixture for the purposes of polishing organic lenses is to observe the ability of the mixture to retain the oxide in suspension. A properly prepared mixture will comprise a low enough viscosity to enable mechanical pumping of the mixture while yet retaining an even dispersion of suspended oxide on standing for several hours.

Among the preferred emulsifiers are those known generically as amine acetate. Suitable compounds include the "Armac" series, available from Armour and Company, which are the acetate salts of aliphatic primary, secondary and tertiary amines possessing one or more aliphatic chains ranging from 8 to 18 carbon atoms, and mixtures of these homologues, e.g., "Armac T" the acetate salt of a mixture of amines containing 85% by weight primary amine, the composition of the primary amine being by weight 30% hexadecyl, 25% octadecyl and 45% octadecenyl. Other similar emulsifiers may be used.

The waxes suitable for the emulsions of this invention include natural waxes, both animal, such as beeswax, and vegetable, such as carnauba wax; petroleum waxes such as paraffin and modified petroleum waxes such as microcrystalline waxes; mineral waxes such as montan wax; synthetic waxes such as "Armowax" available from Armour and Company; and silicone waxes. Mixtures of the waxes may also be used.

In the following examples and throughout the specification and claims, all parts are parts by weight unless otherwise specified. The examples illustrate several suitable basic wax emulsions to which are added the polishing compound, thixotropic agent and water or mineral spirits.

*Example 1*

| Ingredient: | Parts by weight |
|---|---|
| Carnauba wax | 10.0 |
| Amine acetate | 3.5 |
| Water | 86.5 |

The wax and amine acetate were heated until thorough mixing occurred (about 220° F.). The water was added in very small increments with continued mixing.

*Example 2*

| Ingredient: | Parts by weight |
|---|---|
| Oxidized microcrystalline wax | 10.0 |
| Amine acetate | 4.0 |
| Water | 86.0 |

The ingredients were mixed according to the procedure of Example 1.

*Example 3*

| Ingredient: | Parts by weight |
|---|---|
| Carnauba wax | 3.0 |
| Oxidized microcrystalline wax | 7.0 |
| Amine acetate | 3.0 |
| Water | 87.0 |

This example illustrates use of a mixture of waxes. The waxes were heated with the amine acetate and the water added as in Example 1.

*Example 4*

| Ingredient: | Parts by weight |
|---|---|
| Silicone wax | 2.0 |
| Amine acetate | 0.5 |
| Mineral spirits | 8.0 |
| Water | 89.5 |

In this example, the silicone wax and amine acetate were mixed first with the mineral spirits and the water later added as in Example 1.

*Example 5*

| Ingredient: | Parts by weight |
|---|---|
| Paraffin wax | 10.0 |
| Amine acetate | 1.0 |
| Stearic acid | 0.25 |
| Water | 88.75 |

The paraffin wax, amine acetate and stearic acid were mixed and the water then added as in Example 1. The stearic acid in this example functions as a stabilizer for the emulsion.

In the foregoing examples, the silicone wax used may be DC200 available from Dow Corning Company or the S.F. 96 series of General Electric Company having a viscosity of 300 to 500 centipoises. The oxidized microcrystalline wax may be Petrolite C–23 wax, Petronauba C and Petro-nauba D waxes, all available from the Bareco Wax Company.

While the film forming features of this invention have been described as a means of controlling the action of polishing oxides, it is to be understood that a secondary function of the mixtures involved in the application of this invention has to do with the control of aggregates within the oxide. A direct relationship has been observed between the electrical resistivity of a polishing slurry and its ability to polish glass or organic materials. The higher the resistance of the slurry the less danger of forming damaging aggregates of oxide in organic lens polishing slurries. To this end, it is necessary to provide a viscous oxide carrying vehicle having a higher degree of electrical resistance as compared to a water and oxide slurry alone.

The plastic lens is preferably made of a terpolymer of (1) an ester of a glycol with an acid ester of a monohydric alcohol containing at least one aliphatically unsaturated carbon to carbon double bond and carbonic acid in which both hydroxy groups of the glycol are esterified with the acid ester in an amount of 78–98%, (2) a diester of a monohydric alcohol containing at least one aliphatically unsaturated carbon to carbon double bond with a phthalic acid in an amount of 1–20%, and (3) a dialkyl ester of an alkenedioic acid in an amount of 0.25–10%. The most preferred plastic is the terpolymer of 100 parts diethylene glycol di(allyl carbonate), 4 parts of diallyl ortho phthalate and 2 parts of dibutyl maleate.

To make the terpolymer, typical glycol esters are ethylene glycol di(allyl carbonate), diethylene glycol di(allyl carbonate), propylene glycol di(allyl carbonate), tetraethylene glycol di(allyl carbonate), dipropylene glycol di(allyl carbonate), diethylene glycol di(methallyl carbonate), diethylene glycol allyl carbonate methallyl carbonate, ethylene glycol di(vinyl carbonate), triethylene glycol di(methallyl carbonate), diethylene glycol di(2-chlorallyl carbonate), diethylene glycol di(propargyl carbonate), diethylene glycol di(butadienyl carbonate), diethylene glycol di(cinnamyl carbonate) and diethylene glycol di(phenylpropargyl carbonate).

As the phthalate esters for use in making the terpolymer there can be employed divinyl o-phthalate, diallyl o-phthalate, dimethallyl o-phthalate, allyl methallyl o-phthalate, dicrotyl o-phthalate, dioleyl o-phthalate, dipropargyl o-phthalate, di-butadienyl o-phthalate, di 2-chlorallyl o-phthalate, dicinnamyl o-phthalate, diallyl isophthalate, di-crotyl isophthalate, diallyl terephthalate, di-methallyl terephthalate, didecenyl terephthalate and di-methallyl isophthalate.

As the dialkyl ester for making the terpolymer there can be used dimethyl maleate, diethyl maleate, dipropyl maleate, dibutyl maleate, propyl butyl maleate, di 2-ethylhexyl maleate, diamyl maleate, dihexyl maleate, dioctyl maleate, dioctadecyl maleate, dimethyl fumarate, diethyl fumarate, dibutyl fumarate, dioctyl fumarate, di secondary butyl maleate, diisooctyl maleate, dibutyl itaconate and dibutyl citraconate.

The above terpolymers which are the preferred plastic lens material used in the present invention can be prepared according to the process described in my United States Patent No. 2,964,501. The entire disclosure of such patent is hereby incorporated herein by reference, as is the entire disclosure of my United States Patent No. 3,077,707.

The procedure of the present invention is also suitable for polishing lenses made from other plastic materials such as polymerized methyl methacrylate, polymerized diethylene glycol di(allyl carbonate), polymerized methyl α-chloracrylate, polymerized diallyl phthalate, polymerized ethylene glycol dimethacrylate, polymerized diallyl and phenylphosphonate.

What is claimed is:

1. A composition suitable for polishing synthetic resin lenses comprising stannic oxide and an aqueous suspension of wax.
2. A composition according to claim 1 including an inorganic metal oxide selected from the group consisting of titanium dioxide, zirconium dioxide, chromic oxide, ferric oxide and magnesium oxide as an ameliorating agent for the stannic oxide.
3. A composition according to claim 1 also including an emulsifying agent.
4. A composition according to claim 1 wherein the emulsifying agent is amine acetate.
5. A composition according to claim 1 wherein the wax is selected from the group consisting of a natural wax, a petroleum wax, a modified petroleum wax, a mineral wax, a synthetic wax, a silicone wax and mixtures thereof.
6. A composition according to claim 1 also including a surface active agent.
7. A composition according to claim 1 having a viscosity of from 10 to 1500 centipoises.
8. A composition according to claim 7 also including mineral spirits.
9. A composition according to claim 1 having a viscosity of from 1000 to 1200 centipoises.
10. A method of polishing an optical surface made of a synthetic resin comprising supporting a homogeneous mass including stannic oxide as the cutting material and an aqueous suspension of a wax on a solid yieldable surfacing medium and contacting said optical surface with said solid yieldable surfacing medium supporting said homogeneous mass, said suspension having a viscosity substantially greater than that of water.
11. A method according to claim 10 wherein the wax is selected from the group consisting of a natural wax, a petroleum wax, a modified petroleum wax, a mineral wax, a synthetic wax, a silicone wax and mixtures thereof.
12. A method according to claim 10 wherein the synthetic resin is a terpolymer of diethylene glycol di(allyl carbonate), diallyl o-phthalate and dibutyl maleate.
13. A method according to claim 10 wherein there is present in the homogeneous mass an inorganic metal oxide selected from the group consisting of titanium dioxide, zirconium dioxide, chromic oxide, ferric oxide and magnesium oxide as an ameliorating agent for the stannic oxide.
14. A method of polishing an optical surface made of a synthetic resin comprising applying to a pile fabric a homogeneous mass including stannic oxide powder as the cutting agent, up to 70% based on the total weight of stannic oxide and ameliorating agent of a powdered ameliorating agent selected from the group consisting of titanium dioxide, zirconium dioxide, chromic oxide, ferric oxide and magnesium oxide, and an aqueous suspension of a wax to hold the stannic oxide in contact with the optical surface, contacting said optical surface with said pile fabric and constantly moving said pile fabric to provide a yieldable surfacing medium while said contact with the optical surface is maintained.
15. A method according to claim 13 wherein the pile fabric is cotton velveteen pile fabric.

References Cited in the file of this patent

UNITED STATES PATENTS

| | | |
|---|---|---|
| Re. 14,930 | Damon | Aug. 17, 1920 |
| 1,302,320 | Damon | Apr. 29, 1919 |
| 1,689,864 | Darlington | Oct. 30, 1928 |
| 1,965,299 | Patterson | July 3, 1934 |
| 2,024,303 | Obrig | Dec. 17, 1935 |
| 2,129,377 | Liboritz et al. | Sept. 6, 1938 |
| 2,361,784 | Melton et al. | Oct. 31, 1944 |
| 2,548,582 | Boak | Apr. 10, 1951 |
| 2,765,223 | Candee et al. | Oct. 2, 1956 |
| 3,077,707 | Sarofeen | Feb. 19, 1963 |

FOREIGN PATENTS

| | | |
|---|---|---|
| 679,561 | Great Britain | Sept. 17, 1952 |